United States Patent [19]
Gingras, Jr. et al.
[11] 3,922,674
[45] Nov. 25, 1975

[54] TRANSPONDER FOR USE IN A RADIO FREQUENCY COMMUNICATION SYSTEM

[75] Inventors: Gerard J. Gingras, Jr., Chelmsford; James T. Hanson, Maynard, both of Mass.

[73] Assignee: Raytheon Company, Lexington, Mass.

[22] Filed: Jan. 24, 1974

[21] Appl. No.: 436,255

[52] U.S. Cl. .......... 343/6.8 R; 325/65
[51] Int. Cl.² .......... G01S 9/56
[58] Field of Search .......... 343/6.8 R, 6.5 R; 325/9, 325/11, 65

[56] References Cited

UNITED STATES PATENTS

| | | | |
|---|---|---|---|
| 2,820,138 | 1/1958 | Haard | 325/65 X |
| 3,019,296 | 1/1962 | Schelleng | 325/65 X |
| 3,383,618 | 5/1968 | Engelbrecht | 325/65 X |
| 3,605,018 | 9/1971 | Coviello | 325/65 |
| 3,611,145 | 10/1971 | O'Connor | 325/65 |
| 3,684,962 | 8/1972 | Hottel | 343/6.5 R X |

*Primary Examiner*—T. H. Tubbesing
*Attorney, Agent, or Firm*—Richard M. Sharkansky; Philip J. McFarland; Joseph D. Pannone

[57] ABSTRACT

A transponder for use in a radio frequency communication system is disclosed wherein a received radio frequency signal is converted into an intermediate frequency signal, passed through a nonlinear network, converted into a corresponding radio frequency signal and then amplified by a radio frequency amplifier. The nonlinear network provides amplitude sensitive gain and phase adjustment to the intermediate frequency signal to compensate for the gain and phase nonlinearities in the radio frequency amplifier, thereby enabling such amplifier to operate with maximum amplification and efficiency.

8 Claims, 14 Drawing Figures

TRANSPONDER FOR USE IN A RADIO FREQUENCY COMMUNICATION SYSTEM

The invention herein described was made in the course of, or under, a contract or subcontract thereunder, with the Department of Defense.

BACKGROUND OF THE INVENTION

This invention pertains generally to radio frequency communication systems, and more particularly to transponders for use in such systems.

As is known in the art, it is sometimes desired to use, in radio frequency communication systems, transponders to amplify and then retransmit received ratio frequency signals. Such transponders generally include a radio frequency amplifier, such as a traveling wave tube (TWT), to provide the desired amplification. In order to retransmit a received radio frequency signal it is generally desirable for the transponder to perform linearly over its bandwidth. For example, if the radio frequency amplifier is operated in a nonlinear region near saturation, a distorted version of the received signal would be retransmitted. One type of distortion which results from such operation is intermodulation distortion. For example, if a transponder is used in a radio communication system to relay, simultaneously, at least two signals, each having a different frequency, such signals would intermodulate with each other when the amplifier is operated in its nonlinear region near saturation, thereby producing "cross talk" between the signals. In another application, as in a missile application, a missile carries the transponder to relay target reflected radio frequency energy to a ground station. In addition to target reflected radio frequency energy, however, reflections from clutter are also received by the transponder. Therefore, by operating the radio frequency amplifier in its nonlinear region near saturation intermodulation between the clutter reflections may produce frequency components at the frequency associated with the target reflections. The "signal-to-noise" ratio of the retransmitted radio frequency signal is therefore reduced relative to the "signal-to-noise" ratio of the received radio frequency signal.

In radio communication systems wherein a satellite includes a transponder, or in the above described missile application, it is highly desirable that the transponder be compact, lightweight and require minimum operating power. Therefore, in view of the foregoing, it follows that the linearity of a radio frequency amplifier used therein be optimized over the bandwidth of the transponder. The radio frequency amplifier used in such applications must, generally, then be operated about 10 db below the level where saturation of such amplifier begins in order to insure the requisite operating linearity. Generally, however, radio frequency amplifiers operate with 10–25 percent efficiency in the nonlinear region near saturation and consequently by requiring such amplifier to operate 10 db below saturation the efficiency of such amplifiers reduces to about an efficiency of 1 to 3 percent.

SUMMARY OF THE INVENTION

With this background of the invention in mind it is therefore an object of this invention to provide an improved transponder for use in a radio frequency communication system.

It is a further object of this invention to optimize the linearity of the transponder over the operating bandwidth thereof.

These and other objects of the invention are attained generally by including: Means for converting a received radio frequency signal to an intermediate frequency signal; means adapted to adjust the gain and phase of the intermediate frequency signal as a nonlinear function of the amplitude of such signal; means for converting such gain and phase adjusted signal to a corresponding radio frequency signal; radio frequency amplifier means adapted to operate in its nonlinear region near saturation to amplify such converted radio frequency signal, the nonlinear function of the gain and phase shifting means being inverse to the nonlinear gain and phase characteristics of the radio frequency amplifier.

BRIEF DESCRIPTION OF THE DRAWINGS

The above-mentioned and other features of the invention will be more apparent by reference to the following description taken together in conjunction with the accompanying drawings, in which.

DESCRIPTION OF THE PREFERRED EMBODIMENTS

Figures 1, 2:
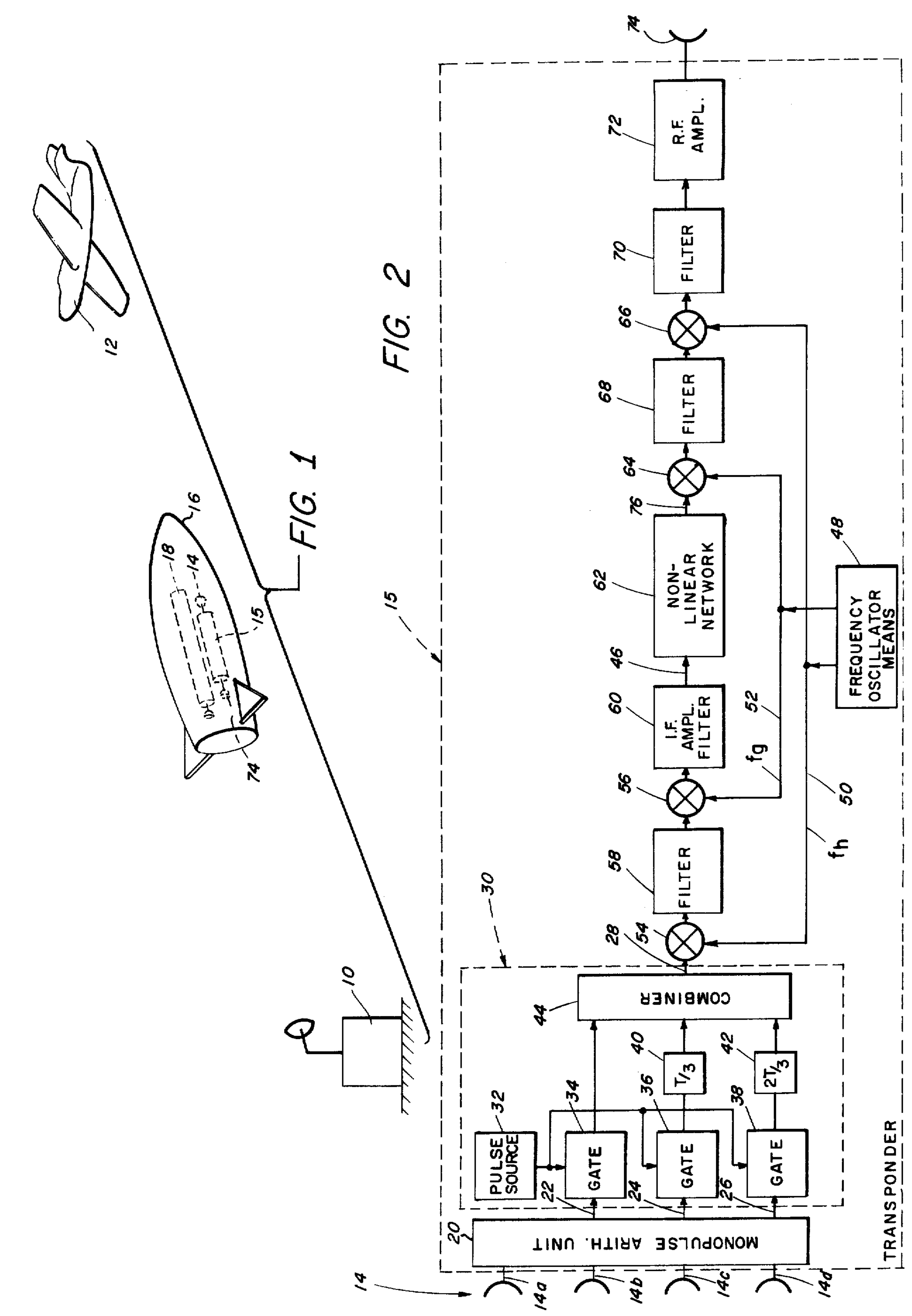
FIG. 1 is a sketch, not in perspective, of a missile system incorporating the features of the invention.
FIG. 2 is a block diagram of a transponder used in the missile system.

Referring now to FIG. 1, a missile system is shown to include a radar ground station 10 for transmitting and directing radio frequency energy towards a target 12. A portion of such radio frequency energy is reflected by target 12 and received by a monopulse antenna 14 of a transponder 15 contained within missile 16. It is here noted that such antenna 14 also receives radio frequency signals reflected from clutter, not shown. It follows, then, that the received radio frequency energy is comprised of a spectrum of frequencies resulting from both target reflections and clutter reflections. Such radio frequency signals are then amplified in the transponder 15, the details of which will be described, and retransmitted to the ground station 10. Then such retransmitted signals are processed by digital processing equipment, not shown, housed within the radar ground station 10. Such digital processing equipment is used to generate appropriate guidance command signals for enabling the missile 16 to be guided successfully to intercept the target 12. Such generated guidance command signals are transmitted to the missile 16 by suitable radio means, not shown, also housed within ground station 10. The missile 16 receives and processes such guidance command signals by means of conventional receiver and guidance processor 18 carried on board such missile.

Referring now to FIG. 2, transponder 15 is shown to include a conventional monopulse arithmetic unit 20 fed by four conventional antenna elements 14*a* to 14*d*. Such antenna elements 14*a* – 14*d* comprise a conventional monopulse antenna 14 to produce a "sum" signal on line 22 and a pair of "difference" signals on lines 24, 26, respectively. The signals on lines 22, 24 and 26 are time multiplexed into a single line 28 by multiplexer 30. Multiplexer 30 includes a pulse generator 32 for generating a train of pulses, here having a period T secs. and a pulse width T/3 secs. Gates 34, 36, 38 are coupled to a different one of the lines 22, 24, 26 as shown. Such gates 34, 36, 38 are here any suitable radio frequency switches responsive to the pulse applied thereto, to pass radio frequency signals fed thereto during the time duration of such pulse. The train of pulses generated by pulse generator 32 is applied to gates 34, 36, 38 and substantially simultaneously. The output of gate 34 is applied directly to combiner 44. Combiner 44 is a summer comprised of conventionally arranged hybrid junctions. The output of gate 36 is applied to combiner 44 through a delay network 40. Such delay network 40 delays the signal gated through gate 36 for T/3 seconds. The output of gate 38 is applied to combiner 44 through a delay network 42, such network being identical to the delay network 40, however, having a delay 2T/3 secs. It follows, then, that the output of delay network 42 delays the signal gated through gate 38 for 2T/3 secs. Therefore, the signal at the output of summer 44 (on line 28) appears as a train of radio frequency pulses, the first one thereof representing the "sum" signal, the next succeeding one thereof representing one of the "difference" signals and the third consecutive one thereof representing the other one of the "difference" signals. The train of radio frequency signals on line 28 is downconverted in frequency to a corresponding train of intermediate frequency signals. Such downconverted signals appear on line 46. Such down conversion is provided by conventional mixers 54, 56, filter 58 and IF amplifier and filter 60 arranged to form a conventional heterodyning network. A suitable intermediate frequency oscillator means 48 is used to provide a signal of frequency $f_h$ on line 50 and a signal of $f_o$ on line 52. The signals on line 46 are fed to a nonlinear network 62, the details of which will be described hereinafter. Suffice it to say here that such network 62 is adapted to adjust the gain and phase of the intermediate frequency signals applied thereto as a nonlinear function of the amplitude of such signals. The intermediate frequency signals developed at the output of nonlinear network 62 are upconverted in frequency to a radio frequency signal by means of a conventional heterodyning arrangement made up of mixers 64, 66, filters 68, 70 and frequency oscillator means 48. The upconverted radio frequency signal is amplified by a radio frequency amplifier 72, here a traveling wave tube, and retransmitted to radar ground station 10 by antenna 74.

Figure 3A:
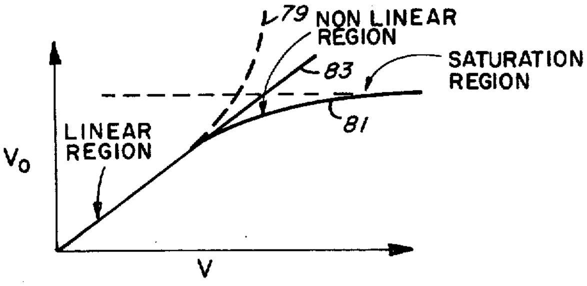
FIGS. 3A and 3B are curves showing the gain and phase characteristics of a radio frequency amplifier used in the transponder.
Figure 3B:
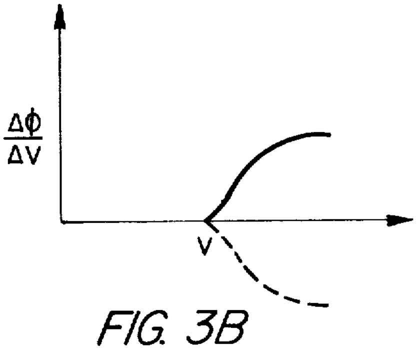

The gain and phase characteristics of radio frequency amplifier 72 are shown in solid curves in FIGS. 3A and 3B, respectively. FIG. 3A shows the nonlinear gain relationship of the radio frequency amplifier 72 (as indicated by the solid curve 81) to be comprised of three regions: a linear region; a nonlinear region; and, a saturation region. As is known, an amplifier having such nonlinear gain relationship may be described by a Taylor series expansion of the form:

$$V_o = a + bV + cV^2 + dV^3 + eV^4 + fV^5 + \cdots$$

where: $a, b, c, d, e, f \ldots$ are constants;

$V_o$ is the output voltage of such amplifier; and, $V$ is the input voltage to such amplifier. Therefore, assuming $V$ is comprised of at least two frequency components, intermodulation between such components will result when the amplifier operates in its nonlinear region. This is sometimes referred to as "AM - AM" (i.e. amplitude modulation to amplitude modulation) intermodulation. The more significant intermodulations are associated with the odd power terms (i.e. $dV^3, fV^5 \ldots$) because the resulting frequency components fall within the bandpass of the transponder. The most significant intermodulation component is $dV^3$ because the energy in such component is generally greater than the energy in the other odd power terms. FIG. 3B shows the nonlinear relationship between an incremental change in phase shift ($\Delta\phi$) per incremental change in input voltage level ($\Delta V$) as a function of the input voltage ($V$) to the amplifier. When the amplifier operates in the linear region, $$\frac{\Delta\phi}{\Delta V}$$

is essentially zero. However, when the amplifier operates in the nonlinear region, the effect of $$\frac{\Delta\phi}{\Delta V}$$

is to generate intermodulation. Such intermodulation is generally referred to as "AM to PM" (i.e. amplitude modulation to phase modulation) intermodulation. Let it be assumed, for example, that the signal applied to the radio frequency amplifier 72 is a composite signal comprised of a signal of frequency $f_1$ and a signal of frequency $f_2$. Further, let it be assumed that the amplitude of such composite signal causes the amplifier 72 to operate in its nonlinear region near saturation, (i.e. near its point of maximum output power.) Because of the nonlinear gain and phase relationship of the radio frequency amplifier, intermodulation (i.e. distortion) will be produced between the frequency components comprising the signal applied to the radio frequency amplifier 72. Further, the signal developed at the output of such radio frequency amplifier 72 (i.e. the retransmitted signal) will be a radio frequency signal having at least four components: One component being a signal of frequency $f_1$; another having a frequency $f_2$; a third having a frequency $2f_1-f_2$ and a fourth having a frequency $2f_2-f_1$, these last two components generally being referred to as the "third-order" intermodulation frequencies.

Figure 4:
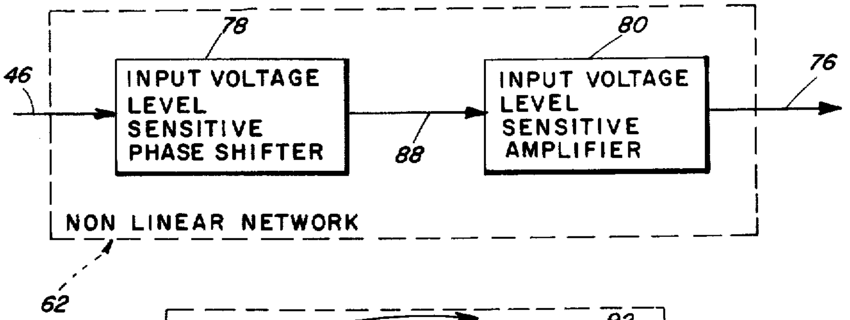
FIG. 4 is a block diagram of a nonlinear network used in the transponder.

Referring now to FIG. 4, nonlinear network 62 is shown to include an input voltage level (or amplitude) sensitive phase shifter 78 and a serially coupled input voltage level (or amplitude) sensitive amplifier 80, the details of which will be described later. Suffice it to say here, however, that the function of the input voltage level sensitive phase shifter 78 is to provide an incremental change in phase shift (i.e. $\Delta\phi$) per incremental change in voltage level ($\Delta V$) of the intermediate frequency signal on line 46 as a nonlinear function of the voltage level of such signal V, such nonlinear function being inverse to the nonlinear $$\frac{\Delta\phi}{\Delta V}$$

vs. V relationship associated with the radio frequency amplifier 72. To put it another way, and referring also to FIG. 3B, the solid line shows the nonlinear relationship between $$\frac{\Delta\phi}{\Delta V}$$

vs. V of the radio frequency amplifier 72, and the dotted curve shows the nonlinear relationship between $$\frac{\Delta\phi}{\Delta V}$$

vs. V provided by the nonlinear network 62. Likewise, the function of input voltage level sensitive amplifier 80 is to provide a nonlinear input voltage ($V$) to output voltage ($V_o$) relationship inverse to the nonlinear input voltage to output voltage relationship associated with radio frequency amplifier 72. That is, referring to FIG. 3A, the solid curve 81 shows the nonlinear relationship between the input and output voltage of the radio frequency amplifier 72 and the dotted curve 79 shows the nonlinear relationship between the input and output voltage of the input power level sensitive amplifier 80. The solid curve 81 and the dotted curve 79 are therefore disposed symmetrically about line 83 where line 83 is here taken as the asymptote associated with the linear region of ammplifier 72. The effect, then, of the nonlinear network 62 is to reduce "AM to AM" and "AM to PM" intermodulations produced by operating the radio frequency amplifier 72 in its nonlinear region. It is here noted that, for reasons to become apparent, a small nonlinear gain relationship may be produced by the effect of the input voltage level sensitive phase shifter 78. The small, but unwanted, effect is compensated by appropriately shaping the nonlinear gain characteristic of the input voltage level sensitive ammplifier 80 so that the nonlinear gain relationship of the nonlinear network 62 is inverse to the nonlinear gain relationship associated with the radio frequency amplifier 72.

Because the up conversion of the intermediate frequency signal (now distorted by the nonlinear network 62 to contain "AM to AM" and "AM to PM" intermodulation frequency components) to a radio frequency signal is a linear process, such radio frequency signal is correspondingly distorted as to the third order intermodulation frequency components and hence contains such third order intermodulation frequency components, now, however, at radio frequencies. However, as just described, the gain and phase distortion produced by the nonlinear network 62 is inverse to the gain and phase redistortion provided by the radio frequency amplifier 72. The effect of the nonlinear network 62 then is to extend the operating region of the radio frequency amplifier 72 to its nonlinear region near saturation to provide maximum linear amplification of the distorted radio frequency signal amplified thereby. The result then is that a low level received radio frequency signal is retransmitted without any significant distortion.

Figure 5:
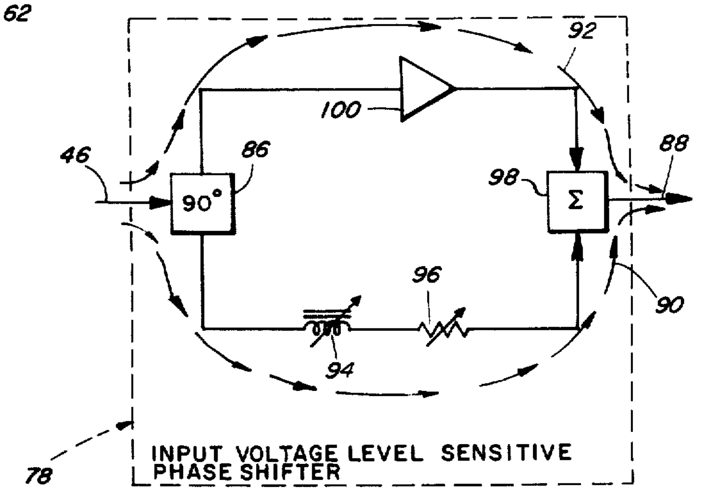
FIG. 5 is a schematic diagram of an input voltage level phase shifter included in the nonlinear network.
Figure 6A:
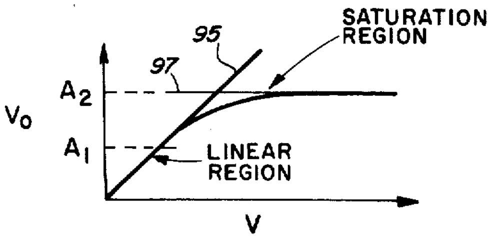
FIGS. 6A and 6B are curves showing the gain and phase, respectively, of a nonlinear amplifier used in the nonlinear network.
Figure 6B:
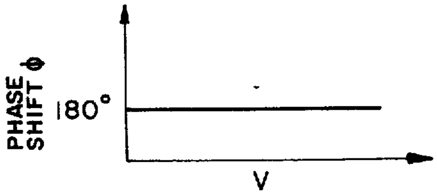

Referring now to FIG. 5, the input voltage level sensitive phase shifter 78 is shown to include a quadrature hybrid 86, the input thereof being coupled to line 46, and the pair of outputs thereof being coupled to output line 88 through different paths 90, 92. That is, the power of the intermediate frequency signal on line 46 is divided between path 92 and path 90. The quadrature hybrid 86 is designed to cause a 90° phase shift between the signals in each path 90, 92. The signal in path 90 passes through a delay line 94, attenuator 96 and one input of a summer 98 to line 88. The signal in path 92 passes through an amplifier 100 to line 88 through a second input of summer 98. The gain and phase characteristics of the amplifier 100 are shown in FIGS. 6A, 6B, respectively. The gain relationship shown in FIG. 6A may be described as a curve having two asymptotes, 95, 97. The asymptote 95 will be used to describe the effect of operating the amplifier 100 in its linear region and the asymptote 97 will be used to describe the effect of operating the amplifier 100 in its nonlinear region. Therefore, asymptote 95 will sometimes be referred to as the "linear" asymptote and asymptote 97 the "saturation" asymptote.

The delay line 94 is adjusted so that the phase shift in the signals in paths 90, 92 differ by 270° over the bandwidth of the transponder.

Figure 7A:
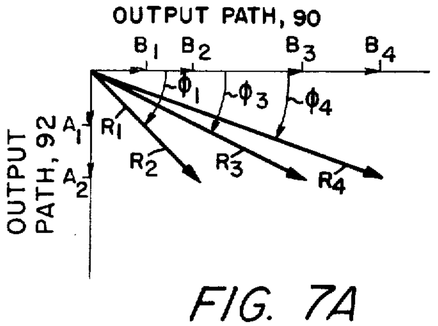
FIGS. 7A and 7B are curves useful in understanding the operation of the input voltage level sensitive phase shifter.
Figure 7B:
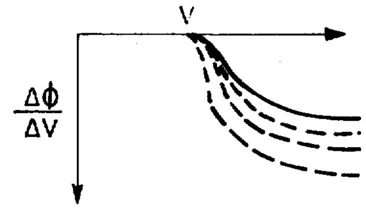
Figure 8:
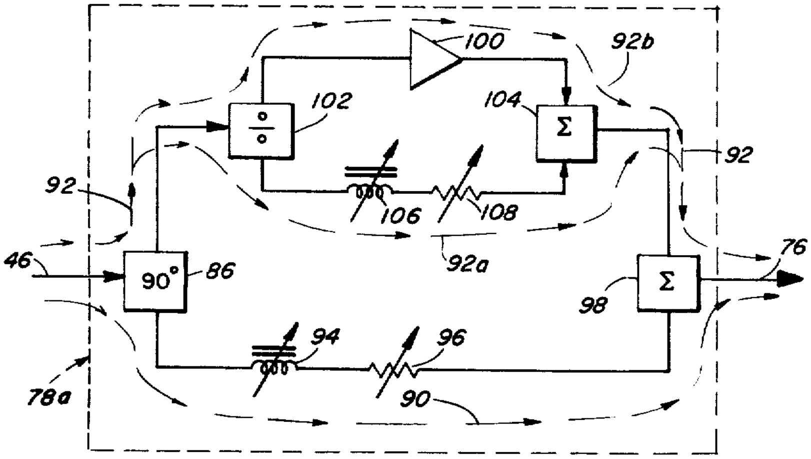
FIG. 8 is a schematic diagram of an alternative embodiment of an input voltage level phase shifter adapted for use in the nonlinear network.

Referring now also to FIG. 7A, the output of summer 98 may be represented as the vector sum of the voltages in paths 90 and 92. Let us first consider that the signal on line 46 causes amplifier 100 to operate in its linear region (i.e. the output of such amplifier 100 being respresented by an exemplary level, $A_1$). Further, let us assume the voltage of the signal passing to the input of summer 98 via path 90 is at an exemplary level, $B_1$. The signal produced at the output of summer 98 then may be represented by vector $R_1$. If we now consider, for purposes of explanation, that the level of the signal on line 46 increases so that the amplifier 100 operates at a level $A_2$ (the level which "exists" at the intersection of the "linear" asymptote and the "saturation" asymptote) and also that the signal applied to the input of summer 98 through path 90 has a voltage level $B_2$, the signal on line 88 may be represented as a vector $R_2$. It is first noted that from such considerations it is evident that the change in phase angle $\Delta\phi$ of the signal on line 88 is zero when the amplifier 100 operates in its linear region. Now considering the effects of operating such amplifier 100 in its saturation region, let it be assumed that the voltage level of the signal on line 46 increases so that such amplifier 100 operates in its saturation region. Then, while the voltage supplied to summer 98 via path 90 increases to exemplary levels $B_2$, $B_3$ and $B_4$, (FIG. 7A) the voltage level of the signal applied to summer 98 via path 92 remains at $A_2$. It follows, then, that the signal produced at the output of phase shifter 78 may be represented by vectors $R_3$, $R_4$ respectively, as shown. Further, it may be observed that the phase $\phi_3$, $\phi_4$ of such vectors $R_3$, $R_4$ changes with corresponding changes in the voltage level of the signal applied to the phase shifter 78 under the assumed conditions. The relationship of $$\frac{\Delta\phi}{\Delta V}$$

vs. input voltage level is then a nonlinear function as is shown in FIG. 7B by the solid curve. The shape of the solid curve shown in FIG. 7B may be altered to one of the dotted curves by either cascading a number of input power level sensitive phase shifters, such as the one described, or by using an input voltage level sensitive phase shifter 78*a*, shown in FIG. 8, or a combination of both. In any event, however, it is desired that the relationship achieved be inverse to the $$\frac{\Delta\phi}{\Delta V}$$

vs. V relationship associated with the radio frequency amplifier 72.

The input voltage level sensitive phase shifter 78a (FIG. 8) is similar to the phase shifter 78 except that the path 92 is divided into two paths, 92*a*, 92*b* as shown by a power divider 102. Paths 92*a*, 92*b* are combined into path 92 by a summer 104. Disposed in path 92*b* is the amplifier 100. Disposed in paths 92*a* are a delay line 106 and an attenuator 108. Such arrangement allows greater flexibility in adjusting the $$\frac{\Delta\phi}{\Delta V}$$

vs. V relationship as shown by the family of dotted curves in FIG. 7B.

Figure 9:
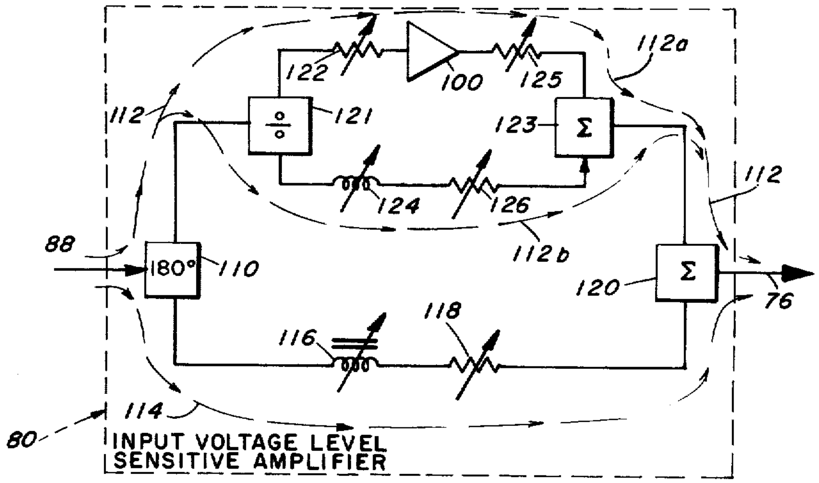
FIG. 9 is a schematic diagram of an input voltage level sensitive amplifier used in the nonlinear network.

Referring now to FIG. 9, input voltage level sensitive amplifier 80 is shown to include a 180° hybrid 110 for dividing the power of the signal on line 88 into two paths, 112, 114, the signals in each path having a 180° relative phase shift therebetween. The signal in path 114 passes to line 76 through a delay line 116, an attenuator 118 and an input of summer 120. The signal in path 112 passes to a second input of summer 120 to line 76 after passing through two paths 112*a*, 112*b* by means of power divider 121. Such paths 112*a*, 112*b* are recombined into path 112 by means of summer 123. Disposed in path 112*a* are an attenuator 122, an amplifier, here amplifier 100, the gain and phase characteristics of which are shown in FIGS. 6A and 6B, and an attenuator 125. Disposed in path 112*b* are a delay line 124 and an attenuator 126. Delay lines 116 and 124 are adjusted so that the signals passing through paths 114 and 112*b* are 180° out-of-phase (over the bandwidth of the transponder) and the signal passing through path 112*a* is 180° out-of-phase (over the transponder's bandwidth) with respect to the signal passing through path 112*b* and in phase with the signal passing through path 114.

Figure 10:
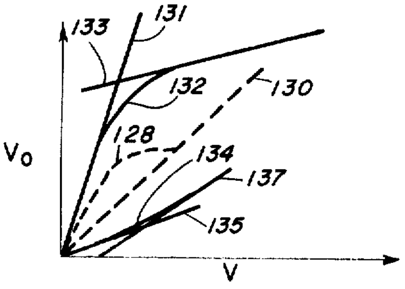
FIG. 10 shows curves useful in understanding the operation of the input voltage level sensitive amplifier.

Referring now also to FIG. 10, the contribution to the signal on line 76 from the signal passing through path

112*a* is shown by the nonlinear dotted line 128 and the combined contribution to the signal on line 76 from paths 112b and 114 is shown by the linear dotted line 130.

Let it first be assumed that the attenuators 126, 118 are adjusted so that the attenuation of attenuator 126 is much greater than the attenuation provided by attenuator 118. That is, let us consider that the signal on line 88 passes to line 76 through two paths, i.e. paths 112*a* and 114. It is first noted that the signals in paths 112*a* and 114 are in phase with each other. As long as the amplificr 100 operates in its linear region, the signal on line 76 will vary linearly with variations in the signal on line 88 as indicated in FIG. 10 by asymptote 131. When the signal level on line 88 is such that the amplifier 100 is operating in its saturation region, the variation in the signal on line 76 will also have a linear relationship with the variations in the signal on line 88. Because the signals in paths 114 and 112*a* are in phase, the signal in path 114 will be added to the fixed level of the signal in path 112*a*. The resulting signal on line 76 then has a gain characteristic represented by the asymptote 133. Between asymptotes 131, 133 the actual gain relationship will be nonlinear as indicated by curve 132. It is particularly pointed out that such relationship is nonlinear in the nonlinear operating region of amplifier 100 and is sometimes referred to as a "compressive" relationship.

If we now consider that the attenuation provided by attenuator 126 is less than the attenuation provided at attenuator 118, the signal on line 88 may be considered as passing to line 76 through two paths, i.e. path 112*a* and 112*b*. It follows that when the level of the signal on line 88 is such that amplifier 100 operates in its linear region, the variation in the signal on line 76 will be linearly related to the variation in the signal on line 88 as indicated by the asymptote 135. However, when the signal on line 88 causes the amplifier 100 to operate in its saturation region, the signal in path 112*b* will subtract (i.e. because it is 180° out-of-phase with the signal in path 112a) from the signal on line 112*a*. The signal on line 76 then will vary in accordance with the asymptote 137, assuming that the level of the signal through path 112*b* is greater than the signal through path 112*a*. The actual gain relationship will be a nonlinear relationship as indicated by curve 134 (FIG. 10), sometimes referred to as an "expansive" relationship. Therefore, the attenuation provided by attenuators 122, 125, 126 and 118 are adjusted so that the $V_0$ vs. $V$ relationship of the input voltage level sensitive amplifier 80 has a nonlinear gain characteristic shown by the dotted curve in FIG. 3A, that is, inverse to the gain relationship of the radio frequency amplifier 72.

Figure 11:
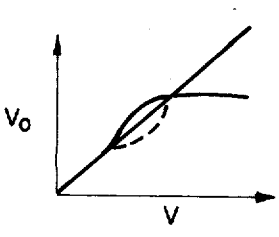
FIG. 11 shows additional curves useful in understanding the operation of the input voltage level sensitive amplifier.

More generally, the radio frequency amplifier 72 may have a nonlinear characteristic requiring both "expansive" and "compressive" relationships as shown in FIG. 11 where the solid curve shows the gain relationship of the radio frequency amplifier 72 and the dotted curve shows the gain relationship of the nonlinear network 62. In any case, the gain relationship of the nonlinear network 62 is made inverse to the gain relationship of the radio frequency amplifier 72.

Having described a preferred embodiment of this invention, it is evident that other embodiments incorporating its concepts may be used. For example, the conversion to the intermediate frequency signal may be done prior to the multiplexing of the sum and pair of difference signals. Further, portions of the input voltage sensitive phase shifter 78 and the input voltage level sensitive amplifier 80 may be interchanged. It is felt, therefore, that this invention should not be restricted to its disclosed embodiments but rather should be limited only by the spirit and scope of the appended claims.

What is claimed is:

1. In a radio frequency transponder wherein a received radio frequency signal is linearly amplified and then retransmitted as a radio frequency signal, such transponder including first heterodyning means for converting the received radio frequency signal to a corresponding intermediate frequency signal; nonlinear means responsive to the amplitude of the intermediate frequency signal, for distorting such intermediate frequency signal in accordance with the amplitude of the intermediate frequency signal; second heterodyning means for converting such distorted intermediate frequency signal to a distorted radio frequency signal; and a nonlinear radio frequency amplifier, fed by the second heterodyning means, adapted to operate in its nonlinear region near saturation to amplify such distorted radio frequency signal into the linearly amplified and retransmitted radio frequency signal, the characteristics of the distorting means being related to the nonlinear characteristics of the non-linear radio frequency amplifier, the improvement wherein such nonlinear means comprises:

a. an amplitude level sensitive phase shifter; and, b. an amplitude level sensitive amplifier serially coupled to such amplitude level sensitive amplifier.

2. The improvement recited in claim 1 wherein the nonlinear radio frequency amplifier has a nonlinear gain and phase shifting characteristic and wherein the nonlinear means has a gain and phase shifting characteristic inverse to the nonlinear gain and phase characteristic of the nonlinear radio frequency amplifier.

3. The improvement recited in claim 2 wherin the amplitude sensitive phase shifter includes means for coupling the input thereof to the output thereof through at least two paths, the electrical length of such paths differing by an odd integral multiple of 90°.

4. The improvement recited in claim 3 wherein one of such paths has disposed therein an amplifier having a nonlinear gain characteristic.

5. The improvement recited in claim 4 wherein the amplifier is characterized as having a linear region and a saturation region.

6. The improvement recited in claim 2 wherein the amplitude sensitive amplifier includes means for coupling the input thereof to the output thereof through at least two paths, the electrical lengths of such paths differing by an integral multiple of 180°.

7. The improvement recited in claim 6 wherein one of such paths has disposed therein an amplifier having a nonlinear gain characteristic.

8. The improvement recited in claim 7 wherein the amplifier is characterized as having a linear region and a saturation region.

* * * * *